US008869366B2

(12) United States Patent
Hao

(10) Patent No.: US 8,869,366 B2
(45) Date of Patent: Oct. 28, 2014

(54) UNIVERSAL BALL JOINT EXTRACTOR

(75) Inventor: Huang-Chia Hao, Taichung (TW)

(73) Assignee: Poul Chang Metal Industry Co., Ltd., Taichung (TW)

( * ) Notice: Subject to any disclaimer, the term of this patent is extended or adjusted under 35 U.S.C. 154(b) by 229 days.

(21) Appl. No.: 13/605,334

(22) Filed: Sep. 6, 2012

(65) Prior Publication Data

US 2014/0059824 A1 Mar. 6, 2014

(51) Int. Cl.

*B23P 19/02* (2006.01)
*B23P 19/04* (2006.01)
*B21D 53/10* (2006.01)
*B25B 27/02* (2006.01)

(52) U.S. Cl.

USPC .................... 29/256; 29/251; 29/259; 29/724

(58) Field of Classification Search

USPC ............................................................ 29/256
See application file for complete search history.

(56) References Cited

U.S. PATENT DOCUMENTS 2,485,022 A * 10/1949 Taylor ............................ 29/283
3,008,226 A * 11/1961 Kellerman ...................... 29/263
3,025,595 A * 3/1962 Stafford .......................... 29/239
3,076,259 A * 2/1963 Stebbins ......................... 29/259
3,237,291 A * 3/1966 Kelso .............................. 29/257
3,403,434 A * 10/1968 Calabro .......................... 29/724
3,781,963 A * 1/1974 Felser, Jr. ........................ 29/282
3,786,544 A * 1/1974 Ferguson ......................... 29/251
3,846,891 A * 11/1974 Elg ................................. 29/261
4,019,233 A * 4/1977 Jirele .............................. 29/261
4,120,082 A * 10/1978 Bond .............................. 29/254
4,343,075 A * 8/1982 Guptill et al. ................... 29/251
4,437,220 A * 3/1984 Gregory ....................... 29/426.5
4,463,489 A * 8/1984 James ............................. 29/259
4,471,517 A * 9/1984 Denmeade et al. ............. 29/259
4,570,319 A * 2/1986 Skoworodko ................... 29/259
4,646,412 A * 3/1987 Eade ............................... 29/259
4,893,395 A * 1/1990 Crowder ......................... 29/259
4,977,660 A * 12/1990 Maynard ......................... 29/251
5,163,210 A * 11/1992 Lostra ............................ 29/252
5,177,852 A * 1/1993 James ............................. 29/259
5,220,716 A * 6/1993 Lostra ............................ 29/252
5,319,832 A * 6/1994 Clement ......................... 29/266
5,836,078 A * 11/1998 Aiken et al. ............... 29/898.07
5,966,792 A * 10/1999 James ............................. 29/244
6,212,775 B1 * 4/2001 Sarver et al. ............... 29/898.08
6,247,216 B1 * 6/2001 Rader, Jr. ........................ 29/252
6,324,740 B1 * 12/2001 Siedler ............................ 29/254
6,418,600 B1 * 7/2002 Benoit ............................ 29/263
6,907,667 B2 * 6/2005 Joyner et al. ............... 29/898.07
7,272,886 B2 * 9/2007 Thomson ........................ 29/724
8,739,377 B2 * 6/2014 Shen ............................... 29/260

* cited by examiner

*Primary Examiner* — Lee D Wilson
*Assistant Examiner* — Alvin Grant

(57) ABSTRACT

A universal ball joint extractor has a first body having a first applying end for engaging with a ball joint. A second body has a second applying end for pushing against a member having the ball joint. A connecting rod connects the second body and the first body to allow relative movements thereof. A control screw for pushing an rear end of the second body and an rear end the first body provides an opposite force to the first applying end to push out the ball joint.

7 Claims, 6 Drawing Sheets

UNIVERSAL BALL JOINT EXTRACTOR

BACKGROUND OF THE INVENTION

1. Field of the Invention

The present invention relates to a disassembly tool, and more particularly to a universal ball joint extractor.

2. Description of the Related Art

In an automobile chassis, there are usually several ball joints employed in the entire mechanism; these ball joints can wear out with time and usage and need replacement. A ball joint mounted to an automobile chassis has a connecting end and a ball joint end. Conventional disassembly tools are composed of a first body, a second body, a connecting rod, and a control screw. A first applying end of the first body pushes against the connecting end of the ball joint. A second applying end of the second body pushes against the automobile chassis. Since the ball joint end is larger than the connecting end, the second applying end is provided with an opening for accepting the ball joint end. When the first body and the second body are disposed correctly, a user operates the control screw to push against both of a second rear end of the second body and a first rear end of the first body to make the first applying end push out the ball joint.

However, different automobile chassis from different manufacturers or for different vehicles have ball joints with different dimensions, which requires different disassembly tools.

As disclosed in EU patent No. EP0803332, the connecting rod connecting the first body and the second body is capable of changing a distance between the second applying end and the first applying end, to adapt to different shaft dimensions of the different ball joints. Furthermore, the second body is changeable for ball joints with different dimensions. However, for different ball joints, different second bodies are required, which is still very inconvenient.

Therefore, it is desirable to provide a universal ball joint extractor to mitigate and/or obviate the aforementioned problems.

SUMMARY OF THE INVENTION

An objective of the present invention is to provide a universal ball joint extractor.

In order to achieve the above mentioned objective, the universal ball joint extractor has a first body having a first applying end for shoving a ball joint; a second body having a second applying end for pushing against a member having the ball joint; a connecting rod connecting the second body and the first body to allow relative movements; and a control screw for pushing a rear end of the second body and a rear end of the first body to provide an opposite force to the first applying end to push out the ball joint. The second body is composed of two applying elements; the two applying elements are pivoted together at both of their rear ends, such that the second applying end can be opened or closed. The corresponding two facing sides of the two applying elements respectively have an accepting aperture. One end of the connecting rod has a base, and two sides of the base are respectively disposed in the accepting aperture of the two applying element.

Both of the two applying elements respectively have the adjusting slot and the accepting aperture and the two applying elements are pivoted together at the rear ends. Two beveled edges of the adjusting member are respectively mounted on the two adjusting slots of the two applying elements. The adjusting member disposed across both of the two adjusting slots and capable of sliding in the two adjusting slots. Dimensions of the adjusting member are relative to an opening angle range of the open-and-closing movements of both the front ends of the two applying elements.

According to the above-mentioned description, the universal ball joint extractor disclosed in the embodiment of the present invention can be used for different ball joints with different shafts and dimensions, which is much more convenient for users. Other objects, advantages, and novel features of the invention will become more apparent from the following detailed description when taken in conjunction with the accompanying drawings.

DETAILED DESCRIPTION OF THE PREFERRED EMBODIMENT

Figure 1:
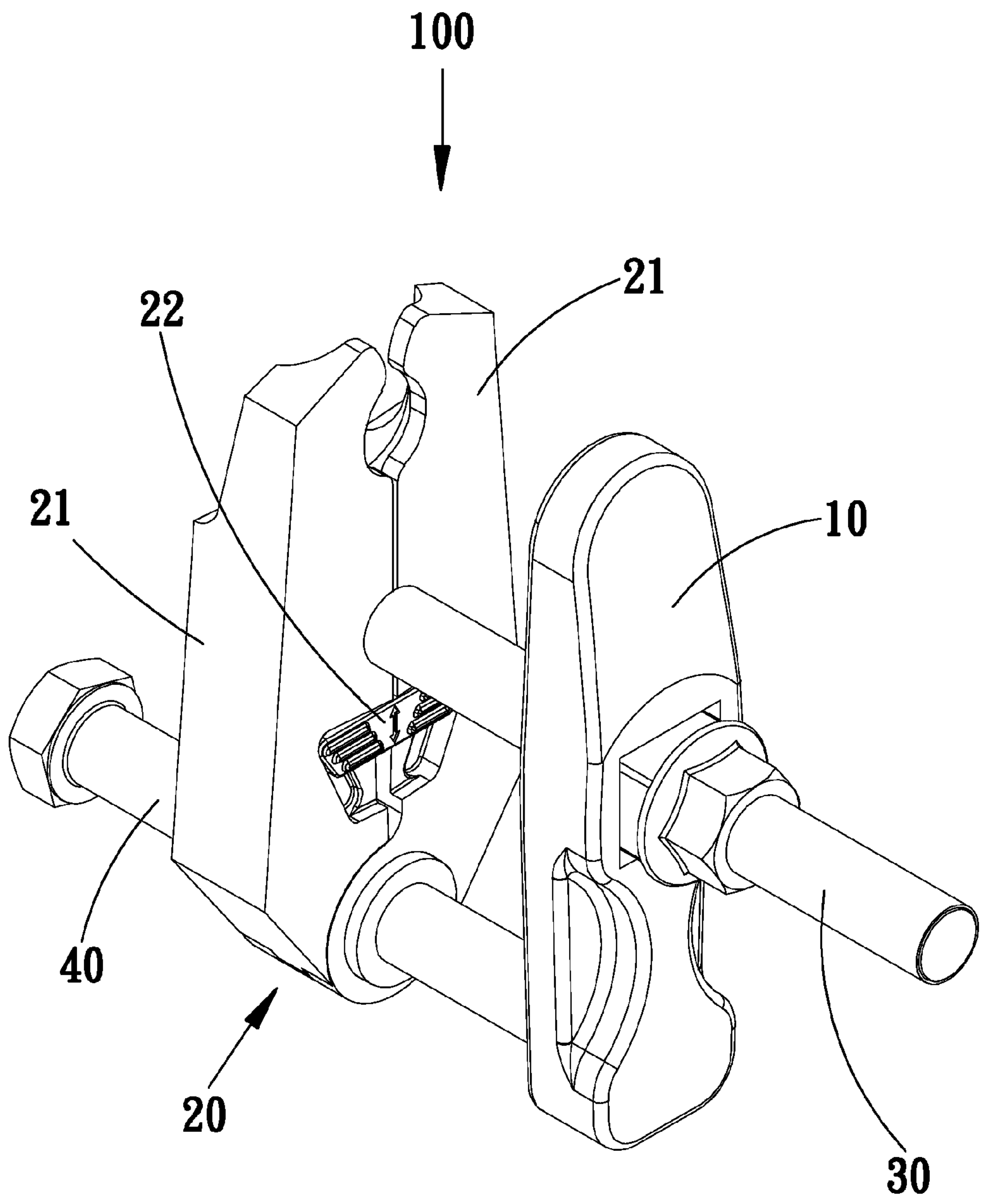
FIG. 1 is a perspective view of a first embodiment of the present invention.
Figure 2:
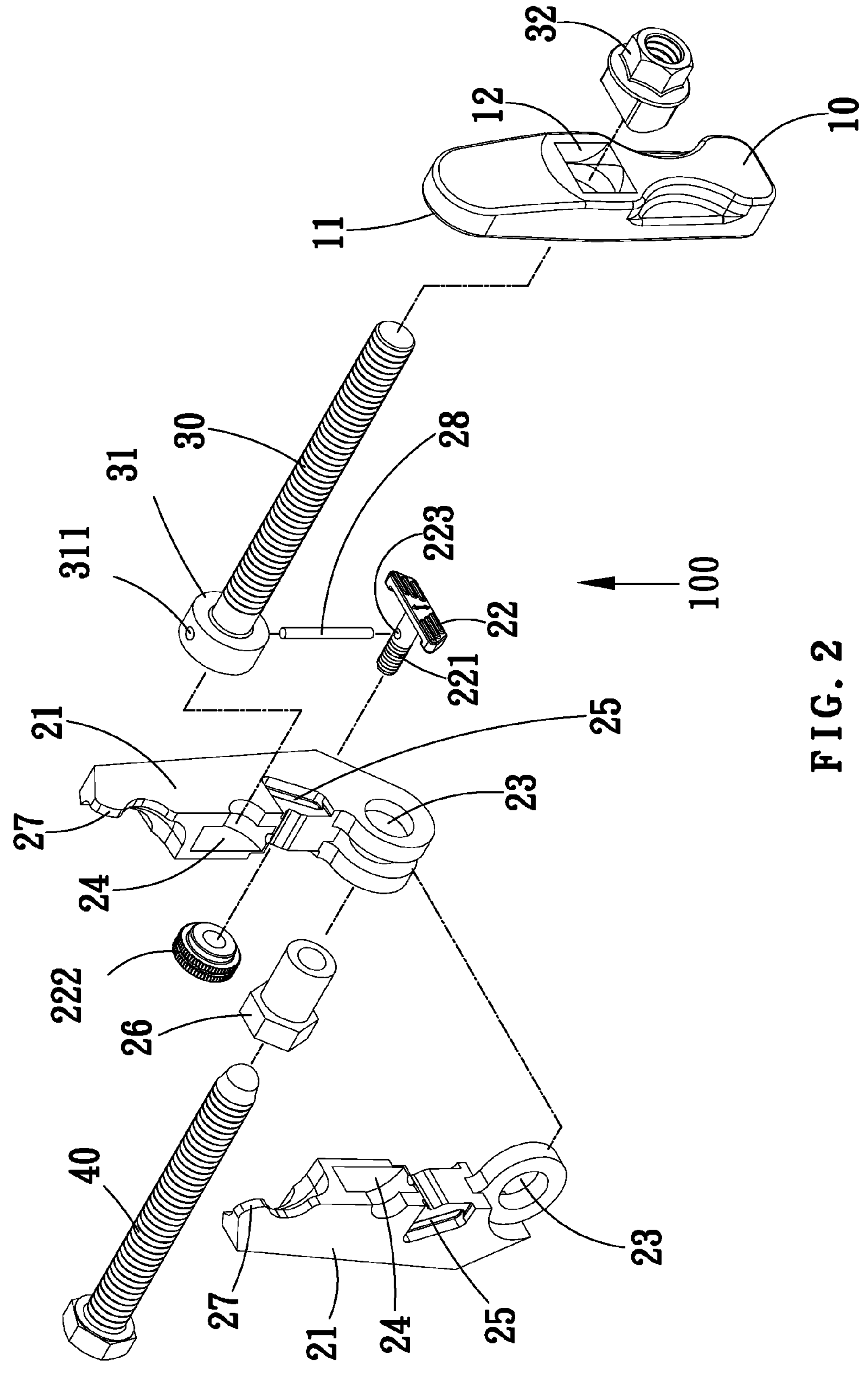
FIG. 2 is an exploded view of the first embodiment of the present invention.

Please refer to FIG. 1 and FIG. 2. In a first embodiment of the present invention, the universal ball joint extractor comprises a first body 10, a second body 20, a connecting rod 30 and a control screw 40. The second body 20 has two applying elements 21 and an adjusting member 22. The two applying elements 21 respectively have a pivoting aperture 23 at their rear ends which are pivoted together by a pivoting shaft 26. The pivoting shaft 26 has a threaded aperture for accepting the control screw 40. The two applying elements 21 respectively have an accepting aperture 24 and an adjusting slot 25 on their corresponding facing sides. One end of the connecting rod 30 has a base 31, and two sides of the base 31 are respectively disposed in the two accepting apertures 24 of the two applying elements 21. Another end of the connecting rod 30 is placed through a first limiting aperture 12 on the first body 10 and screwed with a limiting member 32. The adjusting member 22 has a trapezoidal shape. Two beveled edges of the adjusting member 22 are respectively mounted on the two adjusting slots 25. The adjusting member 22 is capable of sliding in the adjusting slot 25, and the sliding movements are corresponding to the open-and-closing movements of the both front ends of the two applying elements 21. The adjusting member 22 has a locking bar 221 screwed with a locking member 222 at one end. The locking bar 221 has a first positioning aperture 223. The base 31 of the connecting rod 30 has a second positioning aperture 311. A positioning pin 28 is disposed to slide between the two positioning apertures 221, 311.

Figure 3:
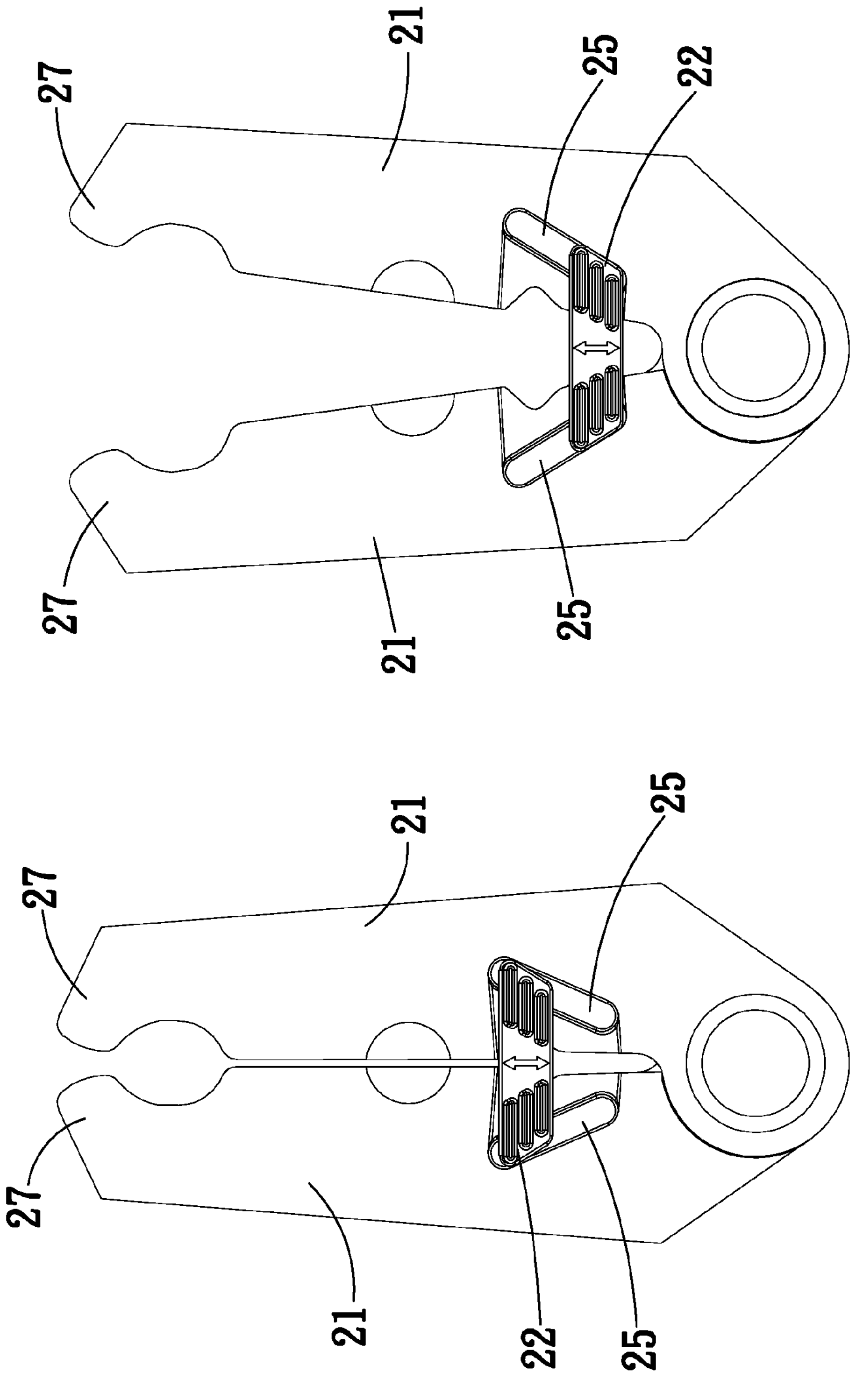
FIG. 3 is a schematic drawing of showing a relationship between the adjusting member sliding in the adjusting slot of the applying element and the opening angle between the second applying ends.

FIG. 3 is a schematic drawing showing a relationship between the adjusting member sliding in the adjusting slot of the applying element and the opening angle between the second applying ends. Two beveled edges of the adjusting member 22 are respectively mounted on the two adjusting slots 25. The beveled edges push apart the two applying elements 21; with relationship between the adjusting member sliding in the adjusting slot of the applying element and the opening angle between the second applying ends, the user can place different ball joints between the second applying end 27.

Figure 4:
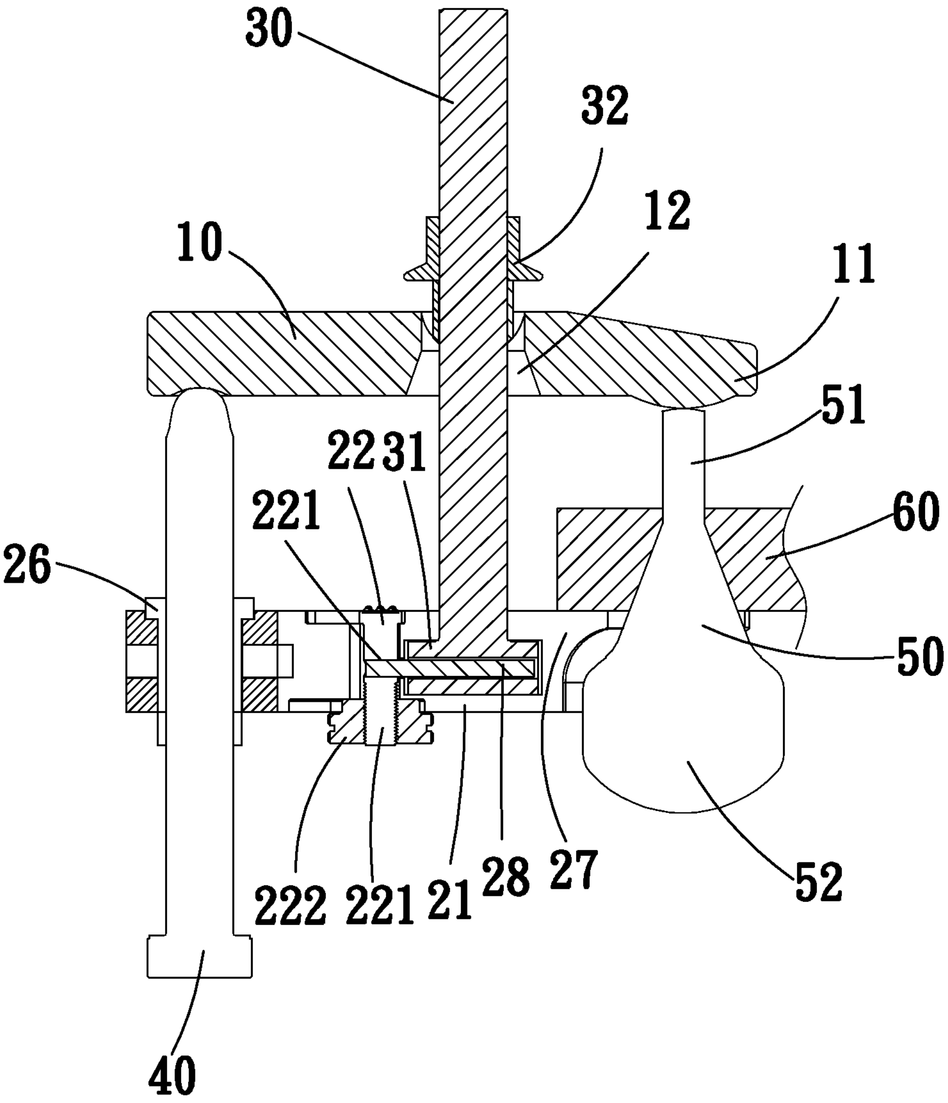
FIG. 4 is a cross-sectional view of the first embodiment of the present invention.
Figure 5:
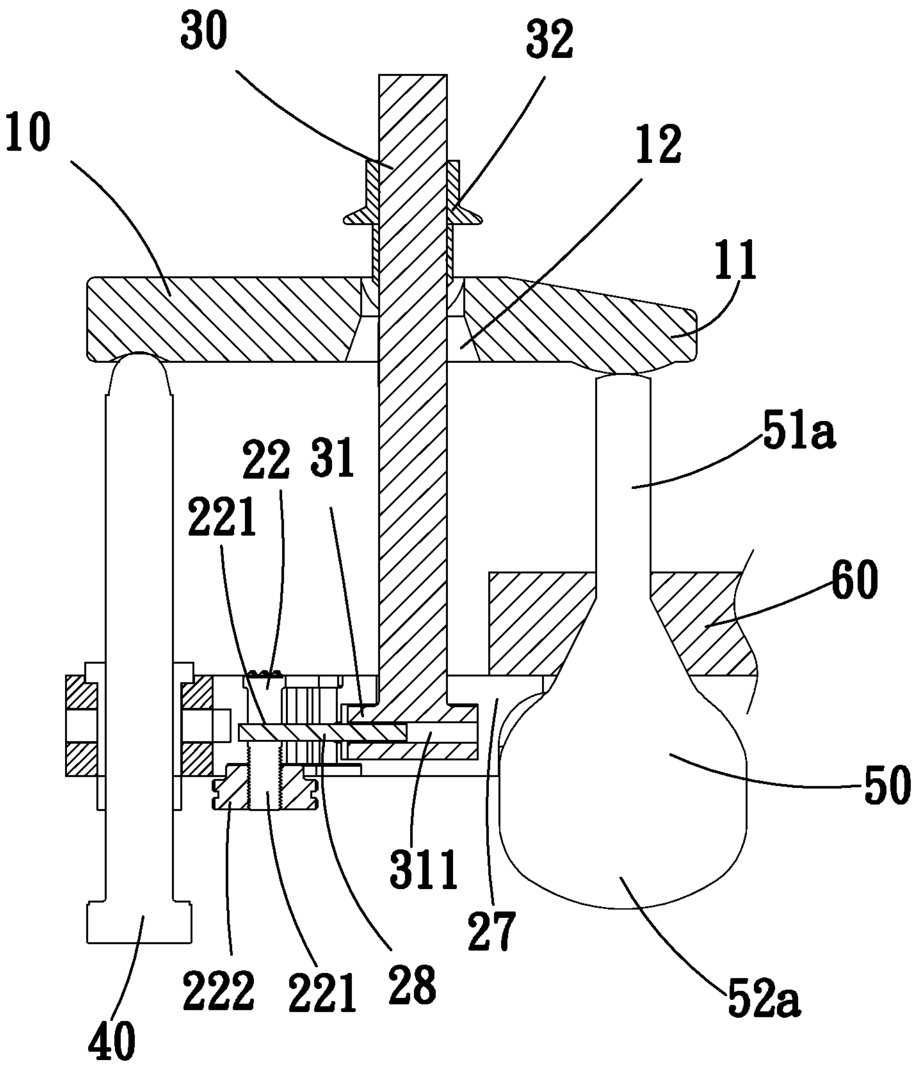
FIG. 5 is a cross-sectional view of the embodiment being applied to a different dimension ball joint.

Please refer to FIG. 4 and FIG. 5. FIG. 4 is a cross-sectional view of the first embodiment of the present invention. FIG. 5 is a cross-sectional view of the embodiment being applied to a different dimensioned ball joint. The first applying end 11 of the first body 10 pushes against the connecting end 51. The second applying end 27 of the two applying elements 21 of the second body 20 are positioned by the adjusting member 22 to match the dimension of the ball joint end 52 and pushes against the base 60. The locking member 222 at the end of the locking bar 221 of the adjusting member 22 is screwed to secure the opening angle between the two applying elements 21. The control screw 40 can be used for pushing the first applying end 11 of the first body 10 to push out the ball joint 50 from the base 60. When the limiting member 32 is disposed on the connecting rod 30, the distance between the first body 10 and the second body 20 can be increased to accept a connecting end 51*a* with a larger dimension. When the adjusting member 22 is pushed, the opening angle between the second applying ends 27 is increased to accept a ball joint 52*a* with a larger dimension. The adjusting member 22 is slid; the positioning pin 28 is located between the first positioning aperture 221 and the second positioning aperture 311 to maintain the pivoting region of the applying element 21, the base and the ball joint 50 on a straight line for stability.

Figure 6:
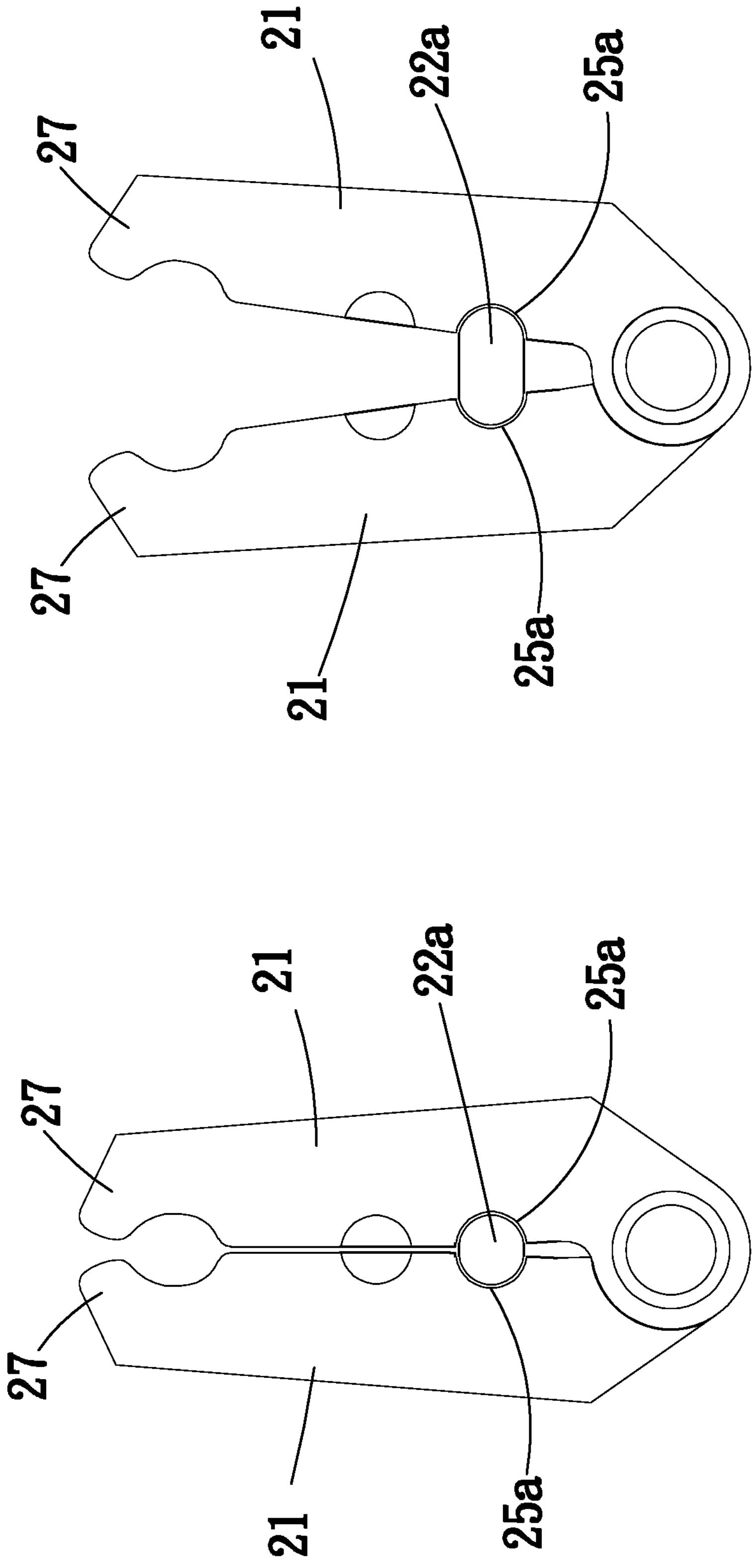
FIG. 6 is a schematic drawing showing different adjusting members in the adjusting slot of the applying element providing different opening angles between the second applying ends according to a second embodiment of the present invention.

Please refer to FIG. 6. FIG. 6 is a schematic drawing showing different adjusting members in the adjusting slot of the applying element providing different opening angles between the second applying ends according to a second embodiment of the present invention. In this embodiment, the adjusting member 22*a* is securely disposed across the two adjusting slots 25*a*. The dimension of the adjusting member 22*a* decides the opening angle between the applying element 21. Therefore, various adjusting members 22*a* can be used for different ball joints 50.

Although the present invention has been explained in relation to its preferred embodiment, it is to be understood that many other possible modifications and variations can be made without departing from the spirit and scope of the invention as hereinafter claimed.

What is claimed is:

1. A universal ball joint extractor comprising:

a first body having a first applying end for pushing a ball joint;

a second body having a second applying end for pushing against a member having the ball joint;

a connecting rod connecting the second body and the first body to allow relative movements thereof; and a control screw for pushing a rear end of the second body and a rear end the first body to provide an opposing force to the first applying end to push out the ball joint;

wherein the second body comprises at least two applying elements, the applying elements pivoted together at respective rear ends, such that the second applying end can be open or closed; the corresponding facing sides of the at least two applying elements respectively having an accepting aperture; one end of the connecting rod has a base, and at least two sides of the base are respectively disposed in the accepting apertures of the at least two applying elements.

2. The universal ball joint extractor as claimed in claim 1, wherein the at least two applying elements respectively have a pivoting aperture for accepting a pivoting shaft to pivot the applying elements together, and each pivoting shaft has a threaded aperture for accepting the control screw.

3. The universal ball joint extractor as claimed in claim 1, wherein the at least two applying elements respectively have an adjusting slot at the conjunction of the accepting aperture and the rear ends, and an adjusting member is disposed across the adjusting slots and capable of sliding in the adjusting slots, sliding movements corresponding to open-and-closing movements of front ends of the applying elements.

4. The universal ball joint extractor as claimed in claim 3, wherein the adjusting member has a trapezoidal shape, beveled edges of the adjusting member are respectively mounted on the adjusting slots.

5. The universal ball joint extractor as claimed in claim 3, wherein the adjusting member has a locking bar, and an end of the locking bar is threaded and screwed with a locking member.

6. The universal ball joint extractor as claimed in claim 3, wherein the adjusting member has a locking bar, the locking bar having a first positioning aperture, the base of the connecting rod having a second positioning aperture, and a positioning pin is disposed to slide between the positioning apertures.

7. The universal ball joint extractor as claimed in claim 1, wherein the applying elements respectively have an adjusting slot at the conjunction of the accepting aperture and the rear ends, and an adjusting member is disposed across the adjusting slots and capable of sliding in the adjusting slots, and dimensions of the adjusting member are related to an opening angle range of the open-and-closing movements of front ends of the applying elements.

* * * * *